United States Patent [19]

Reker

[11] 4,000,918
[45] Jan. 4, 1977

[54] FERRULE FOR LIQUID TIGHT FLEXIBLE METAL CONDUIT

[75] Inventor: Frederick A. Reker, Burlington, Conn.

[73] Assignee: General Signal Corporation, Rochester, N.Y.

[22] Filed: Oct. 20, 1975

[21] Appl. No.: 623,832

[52] U.S. Cl. .............................. 285/93; 285/161; 285/248; 285/342
[51] Int. Cl.² ................................. F16L 35/00
[58] Field of Search ........... 285/93, 248, 249, 342, 285/251, 161; 174/65 R, 65 SS, 78

[56] References Cited

UNITED STATES PATENTS

| | | | |
|---|---|---|---|
| 2,686,066 | 8/1954 | Paquin | 285/93 |
| 2,909,915 | 10/1959 | Kennedy | 285/161 X |
| 3,188,122 | 6/1965 | Smith | 285/342 X |
| 3,332,709 | 7/1967 | Kowalski | 285/93 X |
| 3,647,934 | 3/1972 | Hurtt | 285/161 X |

FOREIGN PATENTS OR APPLICATIONS

| | | | |
|---|---|---|---|
| 642,243 | 6/1962 | Canada | 285/93 |
| 1,071,751 | 3/1954 | France | 285/93 |

*Primary Examiner*—Dave W. Arola
*Attorney, Agent, or Firm*—Milton E. Kleinman; George W. Killian

[57] ABSTRACT

A ferrule is used together with other components to couple a liquid tight fitting to flexible metal conduit. To assure secure coupling, the ferrule must be fully engaged with the flexible metal conduit. Full engagement of the ferrule is not always obtained because of carelessness, burrs, tightness or other obstructions. Even if full engagement is achieved, it is not always maintained as other parts of the fitting are assembled. The improved ferrule includes a hole which provides means for visually inspecting the engagement of the ferrule with the flexible metal conduit even after the fitting is fully assembled. The ferrule may or may not include an outer cylindrical wall for enclosing a portion of the end of the flexible metal conduit.

7 Claims, 4 Drawing Figures

FERRULE FOR LIQUID TIGHT FLEXIBLE METAL CONDUIT

BACKGROUND OF THE INVENTION

This invention relates to liquid tight flexible metal conduit fittings as used in the electrical wiring industry. As is well known to those skilled in the electrical wiring art, flexible metal conduit has a wide number of applications. To couple flexible metal conduit to rigid conduit, distribution panels, hubs or any other device, it is customary to use a liquid tight fitting. Depending upon the environment in which flexible metal conduit is used, it may or may not be covered with a watertight jacket. The invention disclosed herein is described as used with liquid tight flexible metal conduit. Flexible metal conduit, as used in this specification, refers to a flexible conduit which is assembled without conductors and installed in location. Subsequently, conductors are pulled through the flexible metal conduit as is conventional with rigid conduit. Flexible metal conduit of this nature is manufactured from a continuous strip of narrow metal which is formed into the flexible metal conduit by winding the strip in spiral fashion with the edges overlapping and joined together to create a flexible conduit. The joints create helical grooves similar to screw threads both internally and externally of the armor. Flexible metal conduit of this nature is widely used and one form is distributed by the O.Z./Gedney Company with the trade name FLEXI-GUARD.

Flexible metal conduit, of the type cited, is usually cut on a plane at right angles to the axis of the flexible metal conduit. A liquid tight fitting for coupling the flexible metal conduit to rigid conduit, electrical boxes, hubs or the like, must be firmly secured to the flexible metal conduit. Prior art fittings used on flexible metal conduit without watertight plastic jackets employed various techniques for securing the fitting to the armor which relied upon pressure and/or engagement with the outside grooves, or threads, formed during the manufacture of the armor. However, when a watertight covering is used on the flexible metal conduit, such techniques prove unsatisfactory and/or damage the watertight jacket.

In order to provide fittings which provide liquid tight seals and provide an adequate pullout resistance without damaging the watertight jacket, a ferrule was developed which constitutes a cylindrical element having an outside diameter slightly smaller than the inside diameter of the flexible metal conduit and with a thread which will mate with the interior helical seam of the armor. The ferrule could be "screwed" into the armor and the fitting anchored to the ferrule. The ferrule may include an outer cylindrical portion, concentric with the inner cylindrical portion, and with the outer cylindrical portion having an inside diameter which is slightly larger than the outside diameter of the liquid tight flexible metal conduit. A ferrule with the outer cylinder will provide increased resistance to a pullout force. Without the outer cylinder to confine the flexible metal conduit, the conduit may stretch and slip over the threaded ferrule. That is, the outer cylindrical portion restrains the conduit from expanding in response to a pullout force. If the ferrule is not fully engaged with the flexible metal conduit, a reduced resistance to pullout will result. Use of a ferrule with the outer cylinder may result in lack of full engagement between the ferrule and the flexible metal conduit because of careless workmanship, tightness and/or a burr for other obstruction. This disadvantage of the cup-shaped ferrule has resulted in failures and field complaints.

SUMMARY OF THE INVENTION

The present invention discloses a thin wall ferrule which engages with and grips the flexible metal conduit on both the interior and exterior and which provides an inspection means for determining that satisfactory engagement has been obtained between the ferrule and the flexible metal conduit, even after the fitting is fully assembled. Inspectability is provided by including an inspection hole in the ferrule. If the inspection hole is placed on the portion of the ferrule that contacts the interior of the flexible metal conduit and near the wall that joins the inner and outer cylinders of the ferrule, a portion of the flexible metal conduit may be seen through the inspection hole only if the ferrule is fully engaged with the flexible metal conduit. Furthermore, this inspection is possible even after the assembly of the fitting has been completed.

It is an object of the invention to provide a new and improved ferrule for use with flexible metal conduit.

It is a more specific object of the invention to provide a new and improved ferrule for use with flexible metal conduit that permits inspection to verify the required engagement between the ferrule and the flexible metal conduit.

It is another object of the invention to provide a ferrule which functions with liquid tight flexible metal conduit.

It is another object of the invention to provide a thin wall ferrule which provides a minimum effective reduction of the inside diameter of the flexible metal conduit.

It is another object of the invention to provide a flexible metal conduit which includes a liquid tight seal.

BRIEF DESCRIPTION OF THE DRAWING

In describing the invention, reference will be made to the various figures of the drawing in which like reference numbers identify like elements and in which reference numbers which differ only in their first digit are nearly comparable elements and in which.

DESCRIPTION OF THE PREFERRED EMBODIMENT

Figure 1:
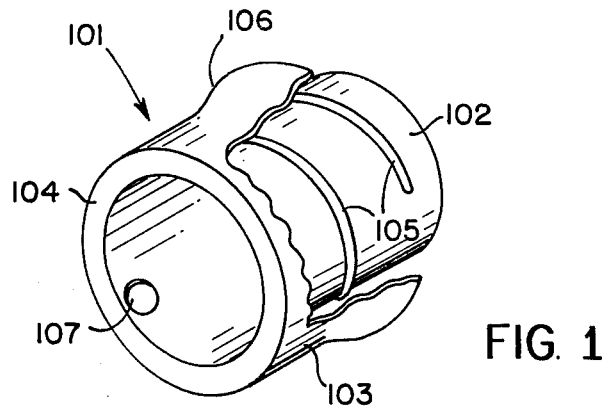
FIG. 1 is a partially cut-away, three dimensional view of the ferrule of the invention.

Considering now more specifically FIG. 1, there is seen a ferrule 101 comprising a first cylindrical portion 102 and a second cylindrical portion 103 which is concentric with the inner cylinder 102 and of a slightly larger diameter. The inner cylinder 102 and the outer cylinder 103 are joined together at one end by a wall 104 so that the ferrule 101 comprises a single member. The inner cylinder 102 has formed thereon threads 105. The outer cylinder 103 may be made with a flared end 106. The inner cylinder 102 includes a hole 107 which serves a function to be described more fully hereinafter. The hole 107 is preferably located near the wall 104 and the hole may even overlap the wall 104 so that part of the wall surface 104 is pierced by the hole 107. In an alternate structure, the outer cylinder 103 may also have a hole (see FIG. 3). If the outer cylinder 103 does include a hole similar to hole 107, it would normally be located near the wall 104.

Figure 2:
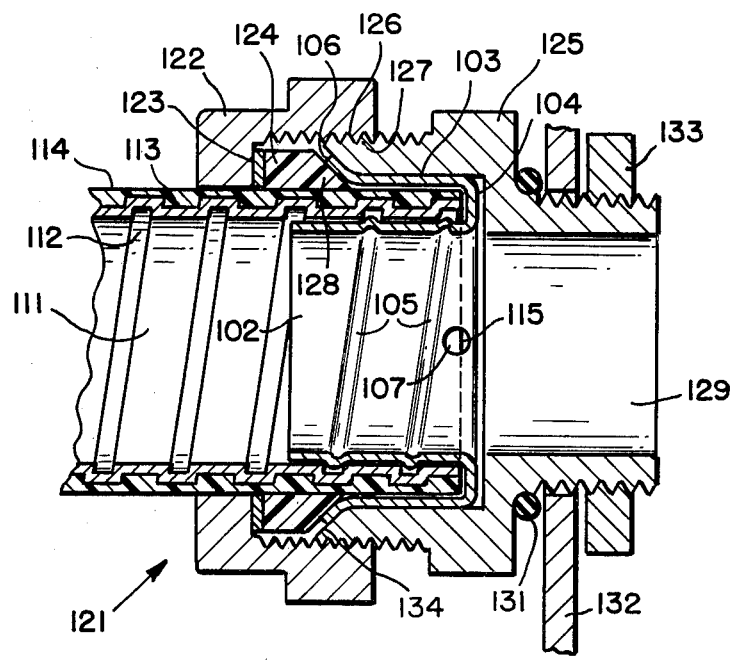
FIG. 2 constitutes a cross section view of the ferrule assembled on a section of flexible metal conduit with other components of a fitting.

Considering now more specifically FIG. 2, there will be seen therein a cross-sectional view of the ferrule 101 and its component parts. The ferrule 101 is designed for use with flexible metal conduit 111 which is widely used in the electrical wiring industry and into which wires may be drawn. The flexible metal conduit 111 is fabricated from a continuous strip of metal which is wound helically with overlapping edges and with the edges joined together to form the flexible metal conduit 111. The helical assembly and joining of the edges result in a helical groove 112 in the interior of flexible metal conduit 111. Thus, the helical groove 112, in effect, forms a screw thread inside the flexible metal conduit 111. A similar helical groove 113 is formed on the exterior of the flexible metal conduit 111. When the flexible metal conduit 111 is to be used in an environment which may be subjected to moisture, a liquid tight covering, or jacket 114, is used on the exterior of the flexible metal conduit 111. The jacket 114 is made of any convenient and suitable flexible material.

To assemble the fitting 121 on the flexible metal conduit 111, a gland nut 122 is placed over the flexible metal conduit 111. Subsequently, a washer 123 and a sealing ring 124 are assembled on the flexible metal conduit 111. The sealing ring 124 may be made of rubber or a soft PVC material which is compressible and which will form a liquid tight seal with the jacket 114. Thereafter, the ferrule 101 is attached to the flexible metal conduit 111 by providing a relative rotational motion between the ferrule 101 and the flexible metal conduit 111 so that the threads 105 of the ferrule 101 mate with the interior helical groove 112 of the flexible metal conduit 111. The ferrule 101 should be turned a sufficient number of times so that the end 115 of the flexible metal conduit 111 is as close as possible to the wall 104. This provides for maximum engagement of the threads 105 with the interior helical groove 112 and thereby more securely fastens the ferrule 101 to the flexible metal conduit 111 against a pullout force. Any burr, tightness or obstruction may prevent the proper seating of the end 115 inside the ferrule 101. In order to assure a proper relationship between the ferrule 101 and the flexible metal conduit 111, the hole 107 is provided in the ferrule 101. After assembly of the fitting 121, the assembly may be inspected through the hole 107 and if the end 115 of the flexible metal conduit 111 is seen, it is an indication that the desired relationship between the ferrule 101 and the flexible metal conduit 111 has been obtained.

To complete the assembly of the fitting 121, the body section 125 is slipped over the ferrule 101 and the gland nut 122 pulled down toward the body section 125 and the gland nut 122 is rotated so that its threads 126 mate with the corresponding threads 127 on the body section 125. In response to continued turning of the gland nut 126, the washer 123 is caused to bear against the sealing ring 124 and press its leading edge 128 under the flared end 106 of the ferrule 101. In response to continued turning of the gland nut 122, the sealing ring 124 is compressed and fills the volume defined by the washer 123, the flared end 106 of the ferrule 101, the outer chamfered edge 134 of the body section 125, the outer diameter of the flexible metal conduit 111 and the inner diameter of the gland nut 122. This compression of the sealing ring 124 provides a watertight seal so that liquids on the exterior of the fitting 121 and/or the flexible metal conduit 111 cannot enter the flexible metal conduit 111 through the fitting 121. After completion of the assembly of the fitting 121, an inspector may look through the inside diameter 129 of the body section 125 and into the hole 107 of the ferrule 101 to inspect for the leading end 115 of the flexible metal conduit 111. By this means, it is possible for an inspector to verify that a complete, accurate and effective assembly of the fitting 121 has been made.

Figure 3:
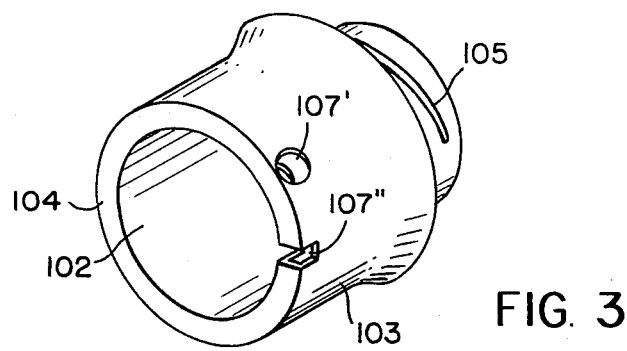
FIG. 3 illustrates an optional form of the ferrule.

Considering now more specifically FIG. 3, there is shown therein an alternate form of the ferrule 101 which includes a hole 107' in the outer cylinder wall 103. The hole 107' serves substantially the same function as the hole 107 during the initial assembly steps of the fitting 121. However, inspection subsequent to completed assembly is not possible. Another alternate form of hole is illustrated as 107" which shows a slot extending from the outer cylinder 103 across the wall 104 and into a portion of the inner cylinder 102. The slot 107" could be made very easily and provide all the advantageous of the hole 107 and/or 107'.

Considering now more specifically FIG. 4, there will be seen an assembly which is similar in many respects to that of FIG. 2, but whose differences will be described more fully hereinbelow. For convenience in making comparisons between the structure of FIG. 2 and that of FIG. 1, the elements of FIG. 4 which nearly (but not identically) correspond with elements of FIG. 2 have been given identifying numbers which correspond with those of FIG. 2 except for the first digit. Elements of FIG. 4 which correspond identically with elements of FIG. 2 have been given identifying numbers which correspond with those of FIG. 2.

Figure 4:
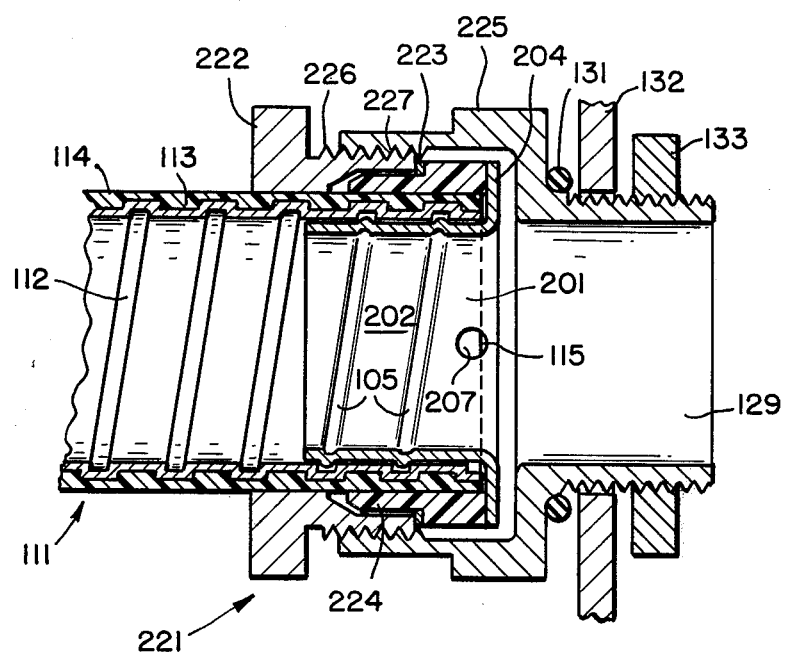
FIG. 4 illustrates another optional form of the ferrule and fitting parts.

It will be seen that there are two major distinctions between the fitting 221 of FIG. 4 and the fitting 121 of FIG. 2. The first is that the ferrule 201 of FIG. 4 does not have an outer cylindrical portion which corresponds to element 103 of FIGS. 1 and 2. The other significant difference resides in the fact that the gland nut 122 of FIG. 2 has female threads 126 while the most closely corresponding part 222 of FIG. 4 has male threads 226. In a corresponding manner, the body section 125 of FIG. 2 has male threads 127 while the corresponding element 225 of FIG. 4 has female threads 227.

The wall 204 of the ferrule 201 has a diameter which is larger than the outer diameter of the flexible metal conduit 111 and which is approximately equal to the inside diameter of the body section 225. When the fitting 221 is assembled, the sealing ring 224 is compressed within the volume defined by the washer 223, the inside diameter of the body section 225, the wall 204 and the jacket 114. The relatively thin wall 204 is supported by the more substantial contacting portion of the body section 225. The hole 207 in the ferrule 201 serves the same function as that described with respect to the hole 107 in the ferrule 101.

The body sections 125 and/or 225 may comprise any convenient figuration for adapting them to mate with another element which may comprise, for example, a fitting on rigid conduit or a hole in an electrical distribution box. The configuration illustrated in FIGS. 2 and 4 is designated for coupling the fittings 121 and/or 221 through a hole in a wall 132 of a distribution box (not shown). The O-ring is used to provide a liquid tight seal between the fitting 121 and the wall 132 of the electrical distribution box. The lock nut 133 is tightened to pull in the body section 125 and compress the O-ring 131 between the body section 125 and the wall 132.

After assembly of a fitting 121 or 221, it is still possible for an inspector to glance through the body section 125 and/or 225 to inspect the ferrule 101 and/or 201 and verify that the flexible metal conduit 111 has its end 115 near the wall 104 and/or 204.

While there has been shown and described what is considered at the present to be the preferred embodiment of the invention, modifications thereto will readily occur to those skilled in the related arts. For example, in another structure, a plurality of viewing holes could be provided to assure that at least one is within a convenient viewing angle. It is believed that no further analysis or description is required and that the foregoing so fully reveals the gist of the present invention that those skilled in the applicable arts can adapt it to meet the exigencies of their specific requirements. It is not desired, therefore, that the invention be limited to the embodiments shown and described, and it is intended to cover in the appended claims all such modifications as fall within the true spirit and scope of the invention.

What is claimed is

1. A metal ferrule for engagement with flexible metal conduit and comprising in combination:
   a. a first cylindrical portion having a threaded body adapted to mate with the interior of an open end of the flexible metal conduit and in electrical engagement therewith;
   b. a wall joined to said first cylindrical portion and extending outward from said first cylindrical portion and having at least a part thereof in a plane at right angles to the axis of said first cylindrical portion for contacting the end of said flexible metal conduit and thereby limit the penetration of said first cylindrical portion within the interior of the flexible metal conduit; and
   c. said ferrule having a hole in the vicinity of the junction of said wall and said first cylindrical portion to provide for inspection of the proximity of the end of the flexible metal conduit to said wall to verify maximum engagement between said ferrule and said conduit.

2. The combination as set forth in claim 1 and including:
   a. a second cylindrical portion concentric with said first cylindrical portion and with said first and second cylindrical portions joined by said wall; and wherein
   b. said second cylindrical portion is proportioned to mate with the exterior of the flexible metal conduit.

3. The combination as set forth in claim 2 and including:
   a. a liquid tight jacket on said flexible metal conduit;
   b. a gland nut and a sealing member arranged on said flexible metal conduit before the ferrule is mated with the flexible metal conduit and with the sealing member closer to said ferrule;
   c. a body member having a cylindrical interior adapted to fit over said second cylindrical portion and adapted to mate with said gland nut and jointly with said gland nut and said ferrule compress said sealing member against said jacket, said ferrule, said gland nut and said body member for providing a liquid tight seal.

4. The combination as set forth in claim 3 and including a washer between said gland nut and said sealing member for minimizing the distortion of said sealing member in response to the mating of said gland nut and said body member.

5. The combination as set forth in claim 4, wherein said hole in said ferrule is not obstructed when said gland nut and said body member are assembled in mating relationship with said ferrule.

6. The combination as set forth in claim 1 and wherein said hole pierces a portion of said first cylindrical portion and a portion of said wall.

7. The combination as set forth in claim 2 and wherein said hole pierces a portion of at least two of the three surfaces comprising:
   a. said first cylindrical portion;
   b. said second cylindrical portion; and
   c. said wall.

* * * * *